May 11, 1965
G. G. LORENZ
3,182,787
CONVEYOR DEVICE
Original Filed July 29, 1960
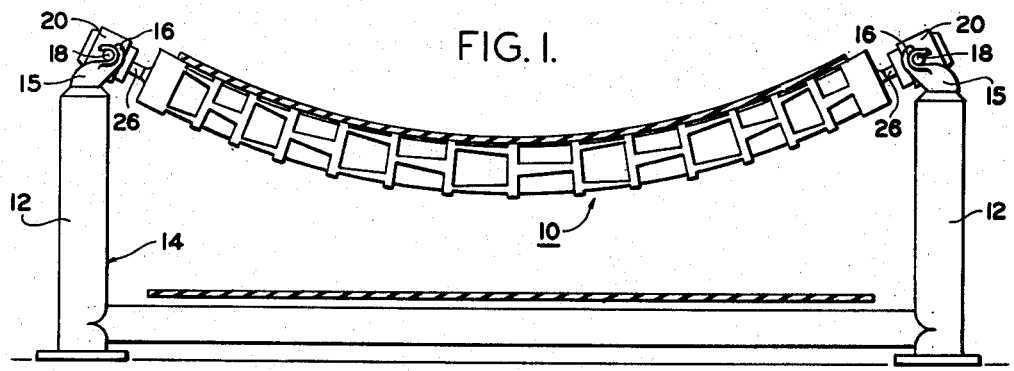
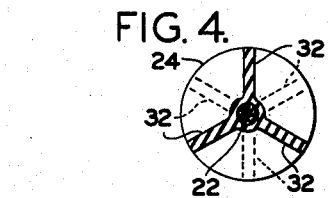
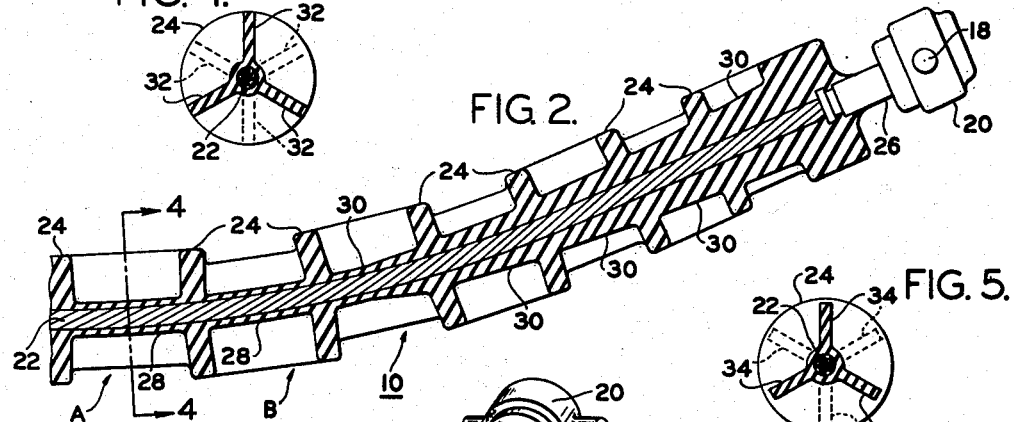
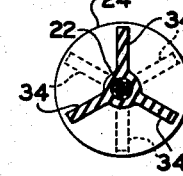
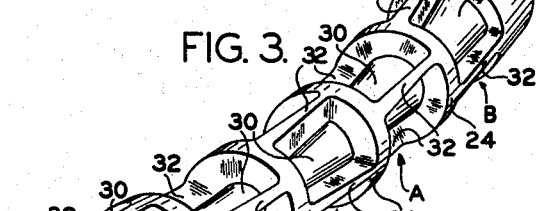
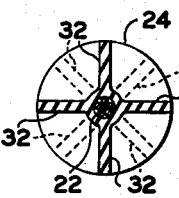
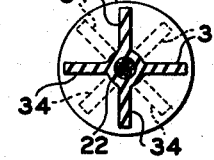
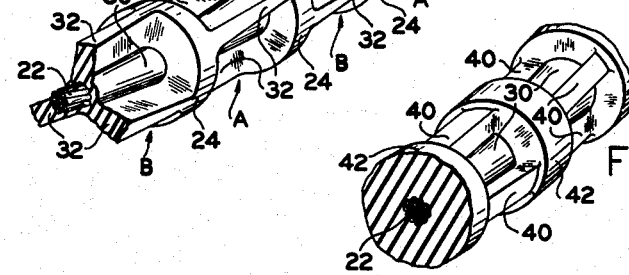
INVENTOR:
GEORGE G. LORENZ
BY
ATTORNEY

3,182,787
CONVEYOR DEVICE

George G. Lorenz, New Philadelphia, Ohio, assignor to Joy Manufacturing Company, Pittsburgh, Pa., a corporation of Pennsylvania
Continuation of application Ser. No. 46,283, July 29, 1960. This application Oct. 15, 1963, Ser. No. 316,799
16 Claims. (Cl. 198—192)

This invention relates to a conveyor device and more specifically to rotatable flexible troughing idlers of the suspension type for supporting a flexible conveyor belt thereon.

The present application is a continuation of my application Serial No. 46,283, filed July 29, 1960, now abandoned.

Conveyor devices such as flexible troughing idlers or rotatable idlers of the type adapted to be suspended between suitable supports in the form of a catenary are known in the art. In the past however certain difficulties have been encountered with some types of flexible idlers due to excessive lateral flexing of the flexible cable. Such excessive lateral flexing is due to the fact that in the known types of idlers comprising spaced roller portions rigidly secured to a flexible cable the flexible cable has unsupported portions intermediate the roller portions so that the conveyor belt is supported by and makes contact only with the spaced roller portions which transfer the load stresses to the cable at such points where the rollers are secured to the cable. Accordingly the lateral and longitudinal thrusts caused by starting and stopping of the conveyor and the depositing of material on the conveyor belt are concentrated at such points on the cable setting up stresses therein. One of the difficulties encountered with such a structure is that inasmuch as the cable is unsupported intermediate the spaced roller portions the catenary of the idler is displaced accordingly to accommodate the load thereby causing the catenary of the idler and the load on the conveyor belt to shift transversely of the direction of travel of the conveyor belt, thus causing spillage of the conveyed material over the side of the conveyor as well as placing an undue stress concentration on the overloaded portion of the idler, belt and bearings. This undue stress further results in kinking of some types of cable such as steel to which the roller portions are secured and accordingly the idler no longer rotates about an axis having a smooth curvature. As the idler rotates about a longitudinal axis having such a kink the steel cable flexes excessively at the kinked portion in the cable and eventually a fatigue failure results in the cable which in turn necessitates replacement of the idler. Another difficulty arising from the use of such structure is the crowding of adjacent roller portions causing the side faces of the adjoining roller portions to rub against each other creating an abrading action of the roller portion which abrading action in addition to causing deterioration of the individual roller portions also causes excessive torque on the roller portions leading to the fracture of the roller portions and the separation thereof from the flexible cable to which they are secured.

Accordingly one object of this invention is to provide a new and improved conveyor device in the form of an elongated flexible idler adapted to be supported in the form of a caternary.

Another object of this invention is to provide a new and improved conveyor device comprising an elongated flexible idler which is adapted to be supported in the form of a catenary to provide underlying support for a flexible conveyor belt and which is of a structure to provide an even distribution of load stresses throughout the length of the idler.

A further object of this invention is to provide a new and improved conveyor device comprising an elongated flexible idler adapted to be supported in the form of a catenary and having a plurality of longitudinally spaced roller portions with means connected to and extending between adjacent roller portions respectively to provide a centering action of a flexible conveyor belt supported thereon.

Still another object of this invention is to provide a new and improved conveyor device adapted to be supported in the form of a catenary and having a plurality of longitudinally spaced roller portions with longitudinally and radially extending flexible means connected to adjacent roller portions respectively.

A more specific object of this invention is to provide a new and improved conveyor device adapted to be supported in the form of a catenary and having a plurality of longitudinally spaced roller portions concentrically secured on an elongated flexible cable having a plurality of circumferentialy spaced bracing members extending radially from the cable and generally longitudinally between the adjacent roller portions respectively.

Another more specific object of this invention is to provide a new and improved conveyor device adapted to be supported in the form of a catenary having a plurality of longitudinally spaced roller portions concentrically secured on an elongated flexible cable having flexible sheathing portions and a plurality of circumferentially spaced bracing members extending radially from the sheathing portions to a radius to less than that of the roller portions and generally longitudinally between adjacent roller portions respectively which bracing members provide for an even distribution of stress throughout the length of each conveyor device.

A further more specific object of this invention is to provide a new and improved conveyor device adapted to be supported in the form of a catenary and having a plurality of longitudinally spaced roller portions concentrically secured on an elongated flexible cable having flexible sheathing portions which sheathing portions adjacent the longitudinal ends of the cable respectively are of a frusto-conical configuration the larger diameters of such frusto-conical configuration being adjacent the ends of the cable respectively and a plurality of circumferentially spaced flexible bracing members extending radially from the sheathing portions and generally longitudinally adjacent the roller portions.

These and other objects of the invention will become more apparent upon consideration of the following detailed description of preferred embodiments thereof when taken in conjunction with the following drawings, in which:

FIG. 1 is a front elevational view of a conveyor device constructed in accordance with the principles of this invention and a suitable support therefor, FIG. 2 is an enlarged fragmentary elevational view partly in cross section of the conveyor device shown in FIG. 1, FIG. 3 is a perspective view of the conveyor device shown in FIG. 2, FIG. 4 is a transverse cross sectional view of the conveyor device shown in FIG. 2 taken substantially along lines 4—4 thereof, FIG. 5 is a transverse cross sectional view of another modification of a conveyor device constructed in accordance with the principles of this invention, FIG. 6 is a transverse cross sectional view of still another modification of a conveyor device constructed in accordance with the principles of this invention, FIG. 7 is a transverse cross sectional view of still another modification of still another conveyor device constructed in accordance with the principles of this invention, and FIG. 8 is a fragmentary enlarged perspective view of still another modification of a conveyor device constructed in accordance with the principles of this invention.

Referring to FIGS. 1, 2 and 3 it will be noted that one embodiment of a conveyor device constructed in accordance with the principles of this invention comprises an idler 10 having a central elongated flexible cable member 22 preferably made of stranded steel wire to which a homogeneous flexible material having the characteristics of being stretchable but incompressible, such as neoprene for example, is concentrically molded intermediate the ends thereof. The molded portion of idler 10 comprises: a plurality of longitudinally spaced roller portions 24; a plurality of longitudinally and radially extending circumferentially spaced bracing members 32 connecting adjacent pairs of roller portions 24 respectively; intermediate sheathing portions 28 extending between members 32 and the roller portions 24, respectively, in the central portion of idler 10; and end sheathing portions 30 extending between members 32 and the roller portions 24 adjacent the end portions respectively, of the idler 10.

Cable member 22 has suitable tubular sleeve portions 26 preferably made of steel rigidly secured as by swedging to the ends thereof, respectively. The sleeve portions 26 are rotatably received in bearing housings 20 which bearing housings 20 have spaced antifriction bearings located therein for rotatably receiving the sleeve portions 26. Pairs of diametrically opposed support shafts 18 project from bearing housings 20 respectively, and serve as a means for supporting the idler member 10 in a suitable mounting means 15 as will hereinafter be described. Inasmuch as the particular construction of the bearings and heretofore described structure for rotatably supporting the idler member 10 as well as the manner in which the homogeneous flexible material is molded to cable 22 does not constitute a part of this invention further description thereof is not believed to be necessary. For a complete disclosure of such structures reference is made to copending application Serial No. 732,697, filed May 2, 1958, which application has been assigned to the same assignee as the assignee of this invention and Patent No. 2,876,890 respectively.

It is to be noted with particular reference to FIG. 1 that the roller portions 24 adjacent the ends respectively of the idler 10 are preferably more closely longitudinally spaced relative to each other than the roller portions 24 therebetween. By so spacing the roller portions 24 a greater belt contacting and supporting surface area of the roller portions 24 is presented to the conveyor belt adjacent the lateral sides thereof and accordingly the stresses on the ends of the idler 10 are more uniformly distributed to the cable 22. The roller portions 24 intermediate the end roller portions 24 are longitudinally spaced as desired along the idler 10. Similarly it will be noted in FIG. 2 that the sheathing portions 30 adjacent the ends of the flexible cable 22 are of partial frusto-conical configuration the larger radial portions of which face longitudinally outwardly. Such an increased amount of sheathing adjacent the respective ends of the cable 22 provides additional reenforcement for the cable 22 at the end portion thereof and acts as a shock dampener to prevent high fatigue stresses in the cable 22 generally concentrated at the ends thereof so that the fatigue failure of cable 22 is substantially reduced and the life of the flexible cable 22 accordingly is substantially increased. If desired sheathing portions 28 and 30 may be omitted.

As shown in FIG. 3 a suitable plurality of circumferentially spaced flexible bracing members or ribs 32, illustratively three, extend generally longitudinally between adjacent roller portions 24 respectively, and radially outwardly from the flexible idler 10 to a radius substantially equal to the radius of roller portion 24 (see FIG. 2). The bracing members 32 are of a suitable thickness and are tapered longitudinally with the widest lateral portion of the bracing members 32 respectively, extending toward the longitudinal center of the idler member 10. It will be noted that the longitudinally spaced adjacent sets of bracing members 32 connecting the respective pairs of roller portions 24 are displaced circumferentially with respect to each other. For the purpose of more clearly explaining this invention alternate sets of three members 32 located intermediate longitudinally spaced pairs of roller portions 24 respectively are designated by the letters A and the sets of three members 32 located therebetween are designated by the letters B in FIG. 3. With this structure bracing members 32 of each set of bracing members A are circumferentially spaced intermediate the bracing members 32 of the adjacent longitudinally spaced sets of bracing members B located on either side thereof. As shown in FIG. 4 the bracing members 32 of one set A of bracing members 32 are circumferentially displaced 60° from the adjacent members 32 of the adjacent longitudinally spaced sets B of members 32. It is to be understood of course that the adjacent sets of bracing members 32 may be circumferentially displaced from each other any desired number of degrees.

FIGS. 5–7 illustrate modifications of the bracing members 32 shown in FIGS. 1–4, whereas FIG. 8 illustrates a modification of the roller portion 24 and the bracing members 32 shown in FIGS. 1–4. Accordingly the structure of the embodiments of FIGS. 5–8 other than the modifications shown in the drawing and explained hereinafter is identical to the structure of FIGS. 1–3.

It will be noted in FIG. 5 that the bracing members 34 (similar to bracing members 32 of FIG. 3) extend radially outwardly from the cable 22 to a radius less than the radius of roller portion 24. Bracing members 34 may extend radially to any desired radius less than the radius of roller portions 24. By so recessing the bracing members 34 a smoother operation of the idler is obtained in that there is no intermittent contact of the outer surface of the bracing members such as bracing members 32 with the belt supported thereon as the idler rotates and hence the possibility of thumping of the idler is eliminated thereby eliminating stresses and shock loads on the cable caused by such thumping.

FIG. 6 shows another modification illustrating four flexible bracing members 32. The provision of four flexible bracing members 32 as opposed to three members 32 obviously affords a larger belt contacting and supporting surface area as well as providing for an idler having less flexibility such as might be required when using a wider flexible belt or when conveying heavier loads on the belt. FIG. 7 illustrates another modification of the bracing members structure wherein four flexible bracing members 34 are provided between each of the adjacent pairs of roller portions 24. Such a structural configuration of bracing members 34 provides for smooth operation of the idler by eliminating any possibility of thumping as explained with reference to FIG. 5 above. In the modifications shown in FIGS. 6 and 7 wherein each set of bracing members 32 and 34 comprises four bracing members 32 and 34 respectively the adjacent longitudinally spaced members 32 and 34 are preferably circumferentially displaced 45° from each other respectively, although any desired amount of circumferential displacement may be made.

Another modification of this invention is shown in FIG. 8 wherein the flexible bracing members or ribs 40 are provided similar to ribs 32 which ribs 40 extend generally longitudinally and radially between the respective adjacent pairs of roller portions 42 and are of a substantially uniform thickness rather than a tapered configuration as shown in FIG. 3. It will be noted in FIG. 8 that the bracing members 40 extend generally longitudinally between each pair of adjacent roller portions 42 and radially outwardly from the cable 22 to a radius substantially less than the radius of roller portions 42. Also the width of the roller portions 42 is substantially greater than the width of the roller portions 24. The thicker bracing members 40 and wider roller portions 42 provide for a less flexible idler while simultaneously providing a greater belt contact area thereby increasing the amount of underlying support to the flexible conveyor belt.

The elongated flexible idler member 10 when in use is suspended in the form of a caternary between suitable support members such as illustrated in FIG. 1 wherein the idler 10 is shown as being supported at each end thereof by a respective one of vertically extending upright members 12 of a support stand 14. The upper ends of the upright members 12 are provided with vertically extending members 15 pivotally mounted about a vertical axis in upright members 12 having oarlock projections 16 respectively, which projections 16 extend laterally inwardly toward each other to provide a mounting means in the form of trunnions to receive support shafts 18 projecting from bearing housings 20 located on the ends respectively of elongated flexible idler 10.

Inasmuch as the cooperation of the specific type of bracing members 32, 34, 32 and 34 as shown in the embodiments of FIGS. 3, 5, 6 and 7 respectively, with roller portions 24, as well as the cooperation of the bracing members 40 with the roller portions 42 shown in the embodiment of FIG. 8 is substantially the same with respect to each other in each of the disclosed embodiments, the following explanation of the embodiment shown in FIG. 3 will follow.

When the idler 10 is supported in the form of a catenary the bracing members 32 on the concave side of the catenary as shown in FIG. 2 being incompressible urge the flexible roller portions 24 on the concave side of the catenary to flex and cant inwardly toward the longitudinal center of the idler 10 to maintain the radial axes of the roller portions 24 on the concave side of the catenary substantially normal to the longitudinal axis of the cable 12. Inasmuch as members 32 are slightly stretchable the roller portions 24 on the convex side of the catenary flex and cant outwardly toward the respective ends of the idler 10 slightly, roller portions 24 being restrained from excessive flexing and canting by members 32 on the convex side of the catenary. This flexing action of the roller portions 24 as the idler member rotates about its longitudinal axis provides for a centering action of the conveyor belt as supported thereon since the roller portions 24 on both sides of the longitudinal center of the idler 10 as a result of this flexing action cant inwardly toward the longitudinal center of the idler 10. This centering action is further induced by the increased sheathing diameter of the respective ends of the idler 10 making the respective ends of the idler 10 less flexible than the center portions thereof.

It should be noted that as the idler 10 rotates about its longitudinal axis the roller portions 24, sheathing portions 28 and 30 and members 32 are being constantly flexed. This constant flexing is due to the compression on the flexible sheathing 30 and members 32 as the idler rotates through the 180° of the concave portion of the catenary and the expansion or stretching of the flexible sheathing portions 28 and 30 and members 32 as the idler 10 rotates the 180° of the convex portion of the catenary. Accordingly each of the roller portions 24 is canted inwardly towards the longitudinal center of the idler 10 for 180° of rotation and then canted outwardly toward the end of the idler 10 for the next 180° of rotation. This constant flexing of the idler provides a cleaning action for the idler 10. Further inasmuch as the radial axis for the respective roller portions 24 are substantially normal to the longitudinal axis of the flexible cable 22 it will be seen that a substantial amount of underlying support is provided for the flexible belt by the roller portions 24 with a minimum of stress concentration on the flexible cable 22 and sheathing portions 28 and 30. Inasmuch as the idler 10 provides an even substantially uninterrupted support for the entire width of the flexible belt supported thereon in the form of a catenary the flexible belt will be restrained from falling between the adjacent roller portions 24.

It will also be noted that the bracing members 32 extend generally longitudinally between the idler rollers 24 to provide a means for longitudinally spacing the individual roller portions 24 thereby avoiding crowding and abrading of the adjacent roller portions 24.

Having described the preferred embodiments of this invention in accordance with the patent statutes it is to be realized that modifications may be made without departing from the broad spirit and scope of this invention. Accordingly it is respectfully requested that this invention be interpreted as broadly as possible and be limited only by the prior art.

I claim:

1. A troughing idler comprising: an elongated flexible member, a plurality of non-metallic resilient load supporting members secured to longitudinally spaced portions of said flexible member, respectively, to extend radially outwardly of said flexible member, said supporting members having a plurality of circumferentially spaced integral elongated rib portions extending longitudinally between said supporting members, each of said rib portions extending radially outwardly of said flexible member with the radially inner portions thereof being secured to said flexible member, all of said supporting members and rib portions being secured to said flexible member to rotate therewith as a unit, each of said rib portions having a substantially greater length than width, and said rib portions having an extent radially outwardly from said flexible member greater than half but not greater than the radial extent of the supporting members from said flexible member with which said rib portions cooperate, respectively.

2. A troughing idler as defined in claim 1 in which said rib portions of each plurality thereof have their radial centers displaced one hundred and twenty degrees (120°) from each other.

3. A troughing idler as defined in claim 1 in which longitudinally adjacent rib portions of said pluralities of rib portions are circumferentially offset from each other.

4. A troughing idler comprising: an elongated flexible member, a plurality of non-metallic resilient load supporting members secured to longitudinally spaced portions of said flexible member, respectively, to extend radially outwardly of said flexible member, said supporting members having a plurality of circumferentially spaced integral elongated rib portions extending longitudinally between said supporting members, each of said rib portions extending radially outwardly of said flexible member with the radially inner portions thereof being secured to said flexible member, all of said supporting members and rib portions being secured to said flexible member to rotate therewith as a unit, each of said rib portions having a substantially greater length than width, and said rib portions having an extent radially outwardly from said flexible member greater than half but not greater than the radial extent of the supporting members from said flexible member with which said rib portions cooperate, respectively.

5. A troughing idler comprising: an elongated flexible member, a plurality of non-metallic resilient load supporting members secured to longitudinally spaced portions of said flexible member, respectively, to extend radially outwardly of said flexible member, said supporting members having a plurality of circumferentially spaced integral elongated rib portions extending longitudinally therebetween, each of said rib portions extending radially outwardly of said flexible member with the radially inner portions thereof being secured to said flexible member, all of said supporting members and rib portions being secured to said flexible member to rotate therewith as a unit, each of said rib portions having a substantially greater length than width, and said rib portions having an extent radially outwardly from said flexible member greater than half but less than the radial extent of the supporting members from said flexible member with which said rib portions cooperate, respectively.

6. A troughing idler as defined in claim 5, in which the radial centers of said rib portions of each of said pluralities are displaced ninety degrees (90°) from each other.

7. A troughing idler as defined in claim 5 in which all portions of said flexible member intermediate the outermost ones of said load supporting members are enclosed by integral means extending from said rib portions and said load supporting means.

8. A troughing idler comprising: an elongated flexible member, a plurality of non-metallic resilient load supporting members secured to longitudinally spaced portions of said flexible member, respectively, to extend radially outwardly of said flexible member, said supporting members having a plurality of circumferentially spaced integral elongated rib portions extending longitudinally therebetween, each of said rib portions extending radially outwardly of said flexible member with the radially inner portions thereof being secured to said flexible member, all of said supporting members and rib portions being secured to said flexible member to rotate therewith as a unit, said rib portions being tapered to increase in lateral width in a direction extending from the ends of said flexible member towards the center of said flexible member, each of said rib portions having a substantially greater length than width, and said rib portions having an extent radially outwardly from said flexible member greater than half but not greater than the radial extent of the supporting members from said flexible member with which said rib portions cooperate, respectively.

9. A troughing idler comprising: an elongated flexible member, a plurality of non-metallic resilient load supporting members secured to longitudinally spaced portions of said flexible member, respectively, to extend radially outwardly of said flexible member, said supporting members having a plurality of circumferentially spaced integral elongated rib portions extending longitudinally therebetween, each of said rib portions extending radially outwardly of said flexible member with the radially inner portions thereof being secured to said flexible member, all of said supporting members and rib portions being secured to said flexible member to rotate therewith as a unit, longitudinally adjacent pluralities of said rib portions being circumferentially displaced relative to each other, each of said rib portions having a substantially greater length than width, and said rib portions having an extent radially outwardly from said flexible member greater than half but not greater than the radial extent of the supporting members from said flexible member with which said rib portions cooperate, respectively.

10. A troughing idler comprising: an elongated flexible member, a plurality of non-metallic resilient load supporting members secured to longitudinally spaced portions of said flexible member, respectively, to extend radially outwardly of said flexible member, said supporting members having a plurality of circumferentially spaced integral elongated rib portions extending longitudinally therebeween, each of said rib portions extending radially outwardly of said flexible member with the radially inner portions thereof being secured to said flexible member, all of said supporting members and rib portions being secured to said flexible member to rotate therewith as a unit, said rib portions being tapered to increase in lateral width in a direction extending from the ends of said flexible member towards the center of said flexible member, longitudinally adjacent pluralities of said rib portions being circumferentially displaced relative to each other, each of said rib portions having a substantially greater length than width, and said rib portions having an extent radially outwardly from said flexible member greater than half but not greater than the radial extent of the supporting members from said flexible member with which said rib portions cooperate, respectively.

11. A troughing idler comprising: an elongated flexible member; an elongated non-metallic resilient load supporting member coaxially secured to a longitudinally extending portion of said flexible member so that said members are rotatable and laterally flexible as a unit; said supporting member having longitudinally spaced roller portions extending radially outwardly of said flexible member; said supporting member having pluralities of circumferentially spaced longitudinally extending rib portions joining adjacent ones of said roller portions, respectively, with the rib portions of each of said pluralities being uniformly circumferentially spaced, each of said rib portions having a substantially greater length than width, and said rib portions extending radially outwardly from said flexible member approximately the same radial distance as but not greater than the radii of the roller portions between which said rib portions longitudinally extend respectively and wherein adjacent ones of said pluralities of said rib portions are circumferentially displaced relative to each other.

12. A troughing idler comprising: an elongated flexible member, a plurality of non-metallic resilient load supporting members secured to longitudinally spaced portions of said flexible member, respectively, to extend radially outwardly of said flexible member, a plurality of circumferentially spaced elongated rib portions extending longitudinally between at least a majority of said supporting members and integral therewith, each of said rib portions extending radially outwardly of said flexible member with the radially inner portions thereof being secured to said flexible member, all of said supporting members and rib portions being secured to said flexible member to rotate therewith as a unit, each of said rib portions having a substantially greater length than width and said rib portions having an extent radially outwardly from said flexible member greater than half but not greater than the radial extent of the supporting members from said flexible member with which said rib portions cooperate, respectively.

13. A troughing idler comprising: an elongated flexible member, a plurality of non-metallic resilient load supporting members secured to longitudinally spaced portions of said flexible member, respectively, to extend radially outwardly of said flexible member, a plurality of circumferentially spaced elongated rib portions integral with and extending longitudinally between at least a majority of said supporting members intermediate the outermost ones thereof, each of said rib portions extending radially outwardly of said flexible member with the radially inner portions thereof being secured to said flexible member, all of said supporting members and rib portions being secured to said flexible member to rotate therewith as a unit, each of said rib portions having a substantially greater length than width and said rib portions having an extent radially outwardly from said flexible member greater than half but not greater than the radial extent of the supporting members from said flexible member with which said rib portions cooperate, respectively.

14. A troughing idler comprising, an elongated flexible member, a plurality of non-metallic resilient load supporting members secured to longitudinally spaced portions of said flexible member, respectively, to extend radially outwardly of said flexible member, a plurality of circumferentially spaced elongated rib portions extending longitudinally between at least a majority of adjacent pairs of said supporting members and integral therewith, each of said rib portions extending radially outwardly of said flexible member with the radially inner portions thereof being secured to said flexible member, all of said supporting members and rib portions being secured to said flexible member to rotate therewith as a unit, each of said rib portions having a substantially greater length than width and said rib portions having an extent radially outwardly from said flexible member greater than half but not greater than the radial extent of the supporting members from said flexible member with which said rib portions cooperate, respectively.

15. A troughing idler comprising, an elongated flexible member, a plurality of non-metallic resilient load supporting members secured to longitudinally spaced portions of said flexible member, respectively, to extend radially outwardly of said flexible member, a plurality of circumferentially spaced elongated rib portions extending longitudinally between at least a majority of said supporting members and integral therewith, each of said rib portions extending radially outwardly of said flexible member with the radially inner portions thereof being secured to said flexible member, all of said supporting members and rib portions being secured to said flexible member to rotate therewith as a unit, said rib portions being tapered to increase in lateral width in a direction extending from the ends of said flexible member towards the center of said flexible member, each of said rib portions having a substantially greater length than width and said rib portions having an extent radially outwardly from said flexible member greater than half but not greater than the radial extent of the supporting members from said flexible member with which said rib portions cooperate, respectively.

16. A troughing idler comprising, an elongated flexible member, a plurality of non-metallic resilient load supporting members secured to longitudinally spaced portions of said flexible member, respectively, to extend radially outwardly of said flexible member, a plurality of circumferentially spaced elongated rib portions extending longitudinally between at least a majority of said supporting members and integral therewith, each of said rib portions extending radially outwardly of said flexible member with the radially inner portions thereof being secured to said flexible member, all of said supporting members and rib portions being secured to said flexible member to rotate therewith as a unit, longitudinally adjacent pluralities of said rib portions being circumferentially displaced relative to each other, each of said rib portions having a substantially greater length than width and said rib portions having an extent radially outwardly from said flexible member greater than half but not greater than the radial extent of the supporting members from said flexible member with which said rib portions cooperate, respectively.

References Cited by the Examiner
UNITED STATES PATENTS 2,608,405 8/52 Salfisber _____ 29—116
2,837,202 6/58 Baechli.

ERNEST A. FALLER, *Primary Examiner.*